(12) United States Patent
Wen

(10) Patent No.: US 8,413,961 B2
(45) Date of Patent: Apr. 9, 2013

(54) CABLE PULLING CAP, METHOD OF MANUFACTURE, AND METHOD OF USE

(75) Inventor: Sydney Wen, Playa Del Rey, CA (US)

(73) Assignee: Belkin International Inc., Playa Vista, CA (US)

( * ) Notice: Subject to any disclaimer, the term of this patent is extended or adjusted under 35 U.S.C. 154(b) by 402 days.

(21) Appl. No.: 12/685,674

(22) Filed: Jan. 11, 2010

(65) Prior Publication Data
US 2010/0176357 A1      Jul. 15, 2010

Related U.S. Application Data

(60) Provisional application No. 61/143,483, filed on Jan. 9, 2009.

(51) Int. Cl.
*H02G 1/08* (2006.01)
*B66F 3/00* (2006.01)

(52) U.S. Cl.
USPC .............. 254/100; 24/265 R; 254/134.3 R

(58) Field of Classification Search .......... 254/134.3 R, 254/100, 134.7, 134.3 FT; 24/265 R
See application file for complete search history.

(56) References Cited

U.S. PATENT DOCUMENTS

| 1,807,993 | A | * | 6/1931 | Martin .................. 294/86.42 |
| 1,829,964 | A | * | 11/1931 | Randall ...................... 403/38 |
| 4,337,923 | A | * | 7/1982 | Smith .............. 254/134.3 FT |
| 4,601,507 | A | * | 7/1986 | Fallon .................. 294/86.42 |
| 4,691,988 | A |   | 9/1987 | Tremblay et al. |
| 6,396,993 | B1 |  | 5/2002 | Giebel et al. |
| 6,993,237 | B2 |  | 1/2006 | Cooke et al. |
| 7,264,402 | B2 |  | 9/2007 | Theuerkorn et al. |

OTHER PUBLICATIONS

PCT International Search Report for Application No. PCT/US2010/020684, dated Mar. 6, 2010, 6 pages.

* cited by examiner

*Primary Examiner* — Hadi Shakeri
(74) *Attorney, Agent, or Firm* — Bryan Cave LLP

(57) ABSTRACT

A cable pulling cap can include: (a) a lower portion with a top and a bottom, the lower portion comprising one or more lower sidewalls, the one or more lower sidewalls define an lower cavity; (b) an upper portion with a top and a bottom, the upper portion including one or more upper sidewalls, the one or more upper sidewalls define an upper cavity, the top of the upper portion having an access channel, the bottom of the upper portion further configured to mechanically couple to the top of the lower portion; (c) a bearing sized to a diameter less than a width of the access channel of the upper portion and located in the upper cavity; and (d) a pulling stem having a first end and a second end, the first end of the pulling stem configured to mechanically coupled to a portion of the bearing. Other embodiments are disclosed in this application.

9 Claims, 7 Drawing Sheets

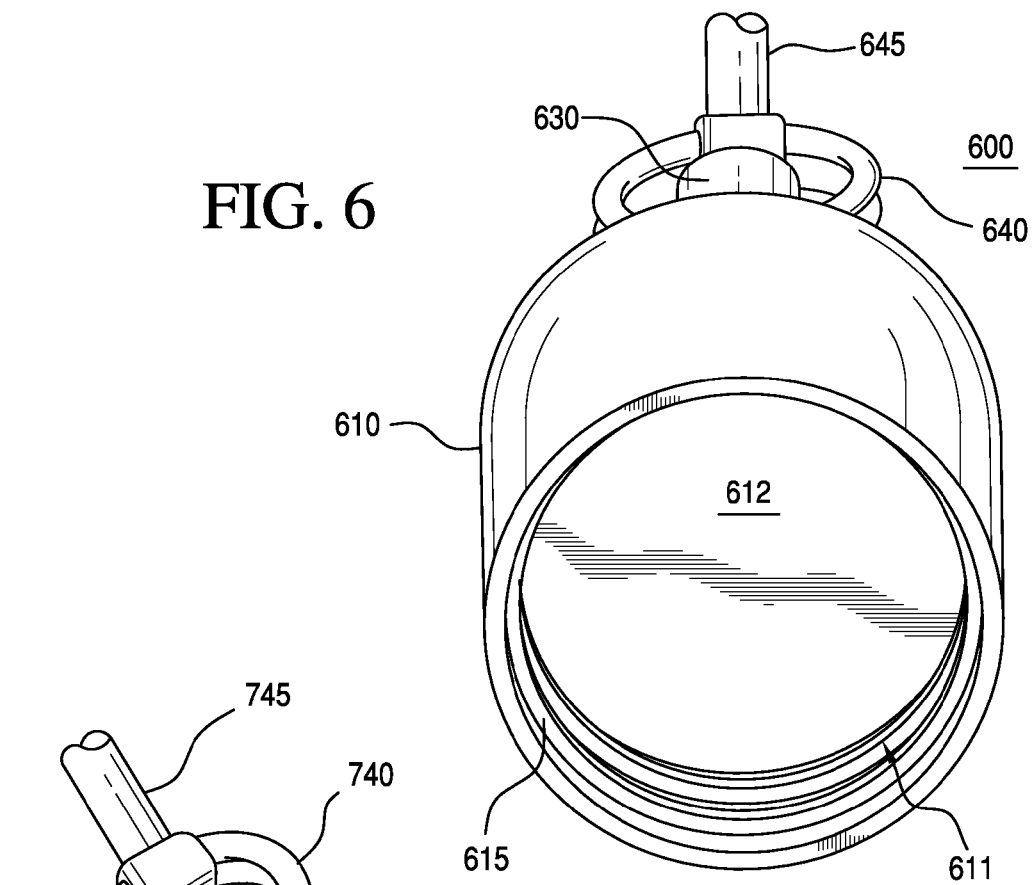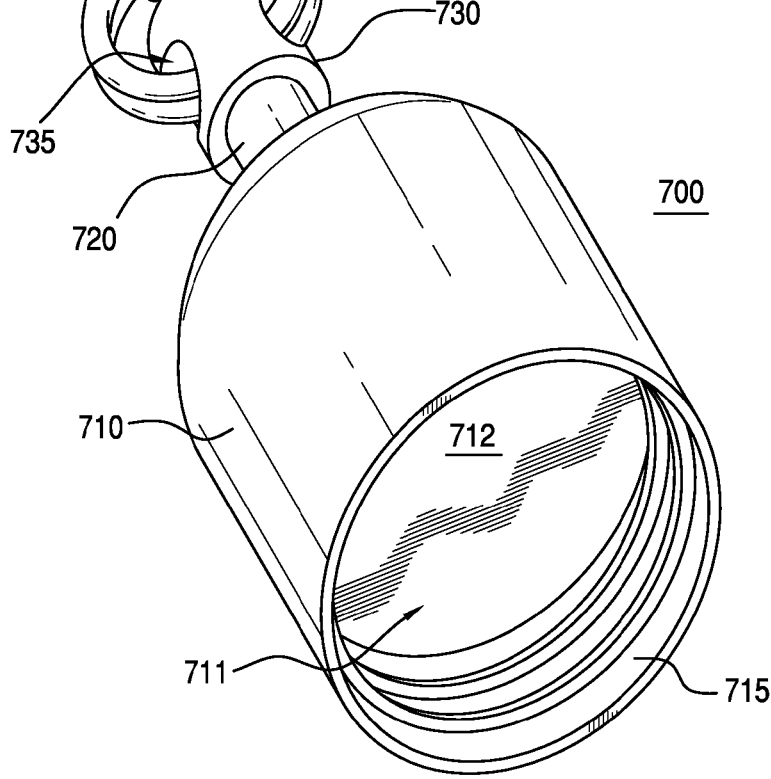

CABLE PULLING CAP, METHOD OF MANUFACTURE, AND METHOD OF USE

CROSS-REFERENCE TO RELATED APPLICATIONS

This application claims the benefit of U.S. Provisional Application No. 61/143,483, filed Jan. 9, 2009. U.S. Provisional Application No. 61/143,483 is incorporated herein by reference.

FIELD OF THE INVENTION

The invention generally relates to connectors for wiring computer, cable and telephone networks. More particularly, the invention relates to connectors for termination of data cables, such as, audio/video cables, telecommunications cables, and the like.

BACKGROUND OF THE INVENTION

Conventional data cables are used in many different applications. For example, conventional data cables allow faster data transfer between key operational locations of a business. In other examples, they can be used to transfer data transfer between rooms in a home. Conventional data cables have many other uses.

Typically, data cables are manufactured from one or more pliable materials, such as plastic compounds, which allow the cables to be maneuvered to the user's desires for installation and use (e.g., bending around desks, around corners). Unfortunately, cables manufactured from pliable materials present difficulty when attempting to maneuver the pliable cables through tight spaces over lengthy distances. Cables can be manufactured from less pliable materials, such as harder plastics, but then will be less useful when installing the cables in typical installation situations.

Unfortunately, due to the aforementioned manufacturing quandary, data cables present problems when attempting to maneuver them through confined spaces, such as through wall interiors, lengthy piping, and the like. Accordingly, a need exists to provide a device allowing a cable manufactured from pliable material to improve the pliable cable's maneuvering through confined areas.

BRIEF DESCRIPTION OF THE DRAWINGS

The invention will be better understood from a reading of the following detailed description of examples of embodiments, taken in conjunction with the accompanying figures in the drawings in which:

FIG. 6 is an isometric internal view of an embodiment of a cable pulling cap portion of the exemplary cable system of FIG. 1;

FIG. 7 is an isometric internal view of another embodiment of a cable pulling cap portion of the exemplary cable system of FIG. 1;

Figure 1:
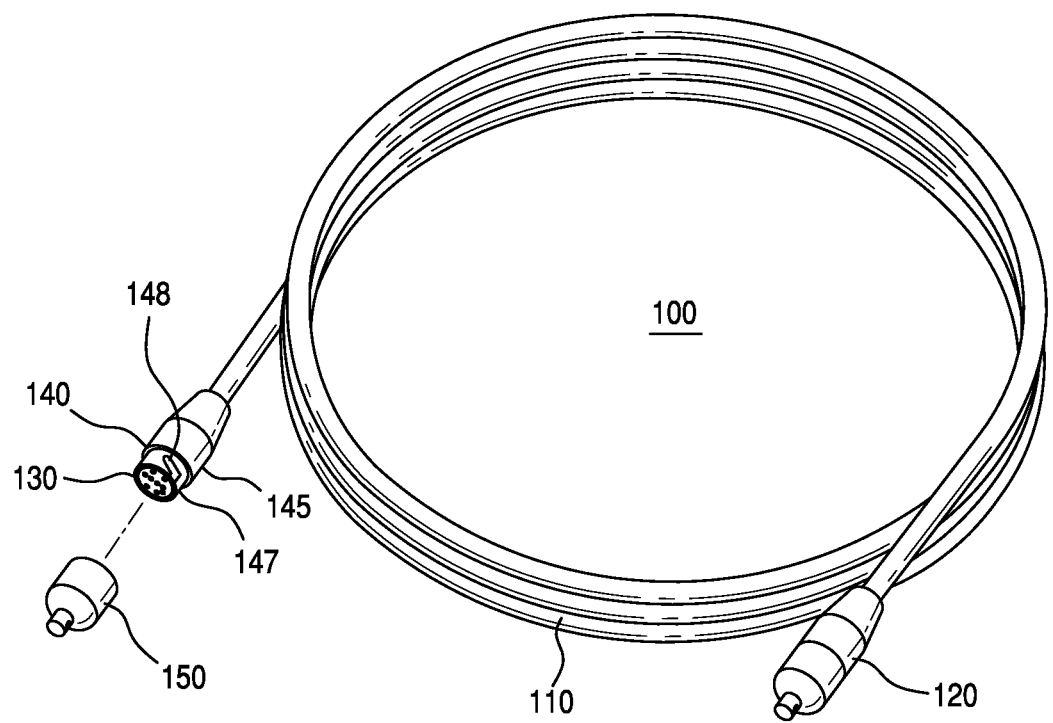
FIG. 1 is an isometric view illustrating an embodiment of an exemplary cable system incorporating an exemplary cable pulling cap, according to an embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of examples of embodiments. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "include," and "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as connected in an electrical, physically, mechanical, or other manner. The term "ring," as used herein, includes items with a general annular, elliptical, polygonal, circular, and/or oval shape. Likewise, the term "annular," as used hereafter, includes elliptical, oval, multi-sided polygon, ring, and/or circular shapes.

DETAILED DESCRIPTION OF EXAMPLES OF EMBODIMENTS

In some examples, a cable pulling cap can include: (a) an upper portion, the upper portion including an upper base having a top and a bottom and upper sidewalls defining an upper cavity, said upper sidewalls each having a upper sidewall bottom in physical communication with the top of the upper base and a upper sidewall top, the upper sidewall top of each upper sidewall configured to together form an access channel for accessing said upper cavity, said upper base additionally including a attachment cavity formed within the bottom of the upper base; (b) a lower portion, said lower portion including a lower base having a top and a bottom and lower sidewalls defining a lower cavity, said lower sidewalls each having a lower sidewall bottom in physical communication with the bottom of the lower base and a lower sidewall top, said upper sidewall top of each lower sidewall configured to together form an cable securing channel, said lower base additionally including a base connection portion mechanically coupled to the top of the lower base and configured to mechanically couple to the interior walls of the upper sidewalls of said upper cavity; (c) a spherical bearing sized to pass through the cable securing channel, the attachment cavity and reside within the upper cavity, the spherical bearing further sized to diameter less than the width of the access channel of the upper portion of the cable pulling cap; and (d) a pulling stem having a first end and a second end, the first end of the pulling stem configured to mechanically coupled to a portion of the spherical bearing, the pulling stem configured to pass through the access channel of the upper portion of the cable pulling cap.

In other examples, a cable pulling cap can include: (a) a lower portion with a top and a bottom, the lower portion comprising one or more lower sidewalls, the one or more lower sidewalls define an lower cavity; (b) an upper portion with a top and a bottom, the upper portion including one or more upper sidewalls, the one or more upper sidewalls define an upper cavity, the top of the upper portion having an access channel, the bottom of the upper portion further configured to mechanically couple to the top of the lower portion; (c) a spherical bearing sized to a diameter less than a width of the access channel of the upper portion and located in the upper cavity; and (d) a pulling stem having a first end and a second end, the first end of the pulling stem configured to mechanically coupled to a portion of the spherical bearing.

In further examples, a cable pulling device configured to mechanically couple to a first coupling mechanism of a cable. The cable pulling device can include: (a) a body portion with a first end and a second end, the first end comprising a second coupling mechanism configured to couple to a the first coupling mechanism of the cable; (b) a stem portion rotatably coupled to the body portion and configured to couple to a pulling mechanism.

In many examples, a method of using a cable can include: providing a cable, the cable having at least one data cable connector; coupling a pulling line to a pulling stem portion of the cable pulling cap; coupling a cable pulling cap to the at least one data cable connector; and securing the cable pulling cable to the cable; and maneuvering the cable through a space.

Turning to the drawings, FIG. 1 is an isometric view illustrating an embodiment of an exemplary cable system 100 incorporating an exemplary cable pulling cap 150, according to a first embodiment. Cable system 100 is merely exemplary and is not limited to the embodiments presented herein. Cable system 100 can be employed in many different embodiments or examples not specifically depicted or described herein.

Not to be taken in a limiting sense but in a simple example, cable pulling cap 150 can be used to pull cable 110 through a space. In some embodiments, the cable pulling cap can include and/or be attached to a cable pulling line 545 (FIG. 5), and the cable pulling line can be used to help maneuver the cable through the space. For example, the cable can be maneuvered through a tight or confined space (a wall interior or length piping) over a lengthy distance by threading cable pulling line through the space and then using the cable pulling line to pull the cable through the space.

As illustrated in FIG. 1, cable system 100 can include: (a) cable 110; (b) a first cable end 120; and (c) a second cable end 130. Second cable end 130 can include: (a) cable connector end 140; and (b) cable pulling cap 150. First cable end 120 can be similar to or different from second cable end 130. For example, first cable end 120 can have a fixed or removable cable pulling cap. Cable connector end 140 can include: (a) connector body 145; (b) a connector tip 147; and (c) cap securing slot 148. In one embodiment, cable 110 additionally includes a cover or casing that can be manufactured from any suitable material, such as, for example ABS (acrylonitrile butadiene styrene) plastic, silicon rubber and the like. In FIG. 1, exemplary cable system 100 may include elements not relevant to the present discussion.

In some embodiments, cable pulling cap 150 can include a securing nub (not shown) having a diameter corresponding in size to the width of the slot portion of cap securing slot 148. In these embodiments, cable pulling cap 150 is secured to cable connector end 140 of second cable end 130 by aligning the securing nub of cable pulling cap 150 with cap securing slot 148 and rotating and/or otherwise maneuvering the securing nub of cable pulling cap 150 through cap securing slot 148 to a secure position near the base of cable connector end 140.

This embodiment of securing cable pulling cap 150 to cable connector end 140 is but one of many different ways to secure cable pulling cap 150 to cable connector end 140. Other configurations and methods of securing cable pulling cap 150 to cable connector end 140 of second cable end 130 are described in the figures below. Embodiments of cable connector end 140 are shown in FIGS. 2 and 3, and embodiments of cable pulling cap 150 are shown in FIGS. 4-12.

In some embodiments, cable 110 can be implemented as an audio/video cable, such as, the AV360 cable available from Belkin International, Inc. in Compton, Calif. In other embodiments, cable 110 can be implemented as a telecommunications cable, an RJ11 cable, a two-twisted pair telephone/communication cable, a four-twisted pair telephone/communication cable, a coaxial cable (e.g., BNC ((Bayonet Neill-Concelman) connector, RCA (Radio Corporation of America) connector, or F connector), a fiber-optic cable, or a residential or commercial power cabling or flexible conduit (e.g., conduits for carrying many of the previously listed cable types).

Figure 2:
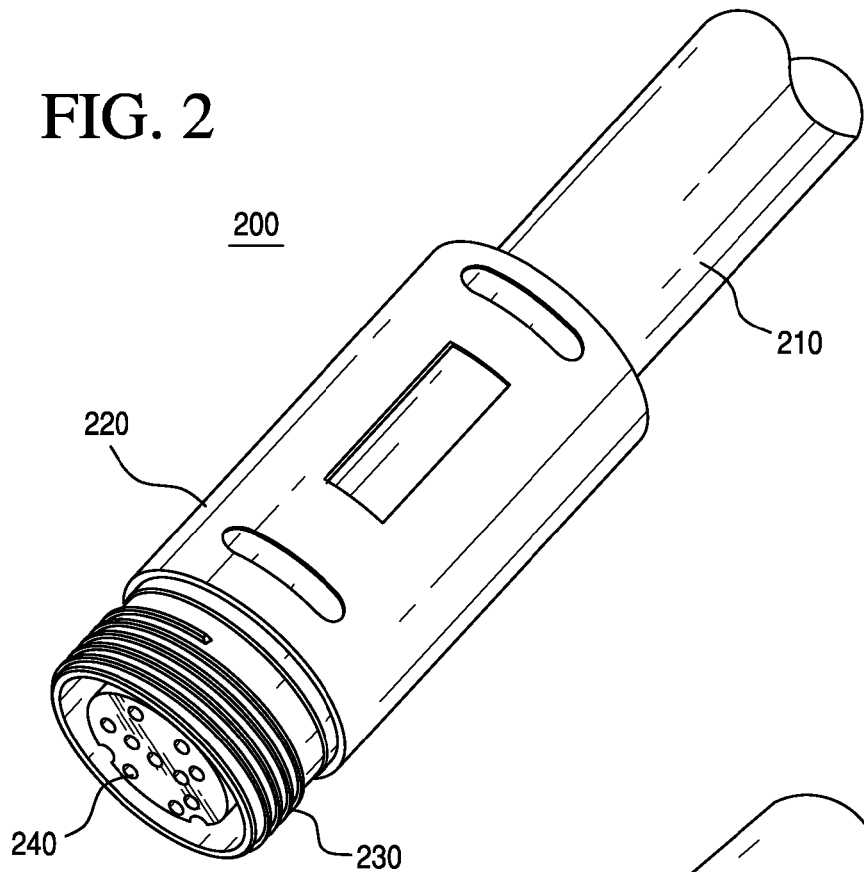
FIG. 2 is an isometric view of an embodiment of a cable connector end portion of the exemplary cable system of FIG. 1.
Figure 3:
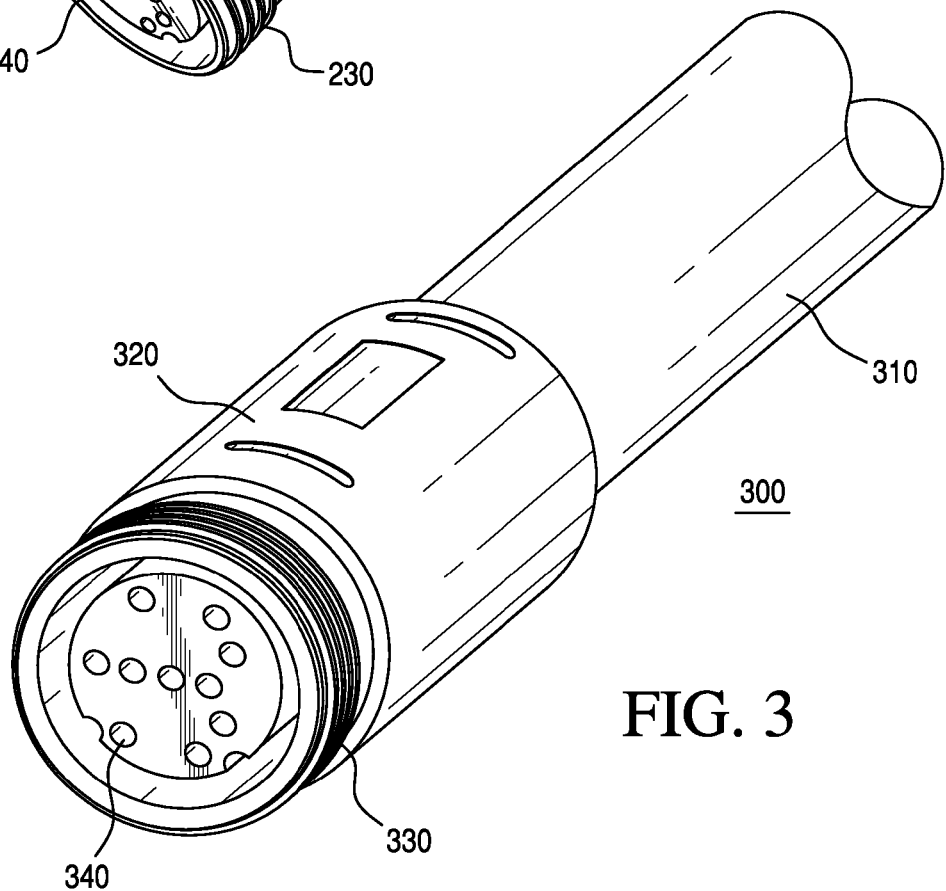
FIG. 3 is an isometric view of another embodiment of a cable connector end portion of the exemplary cable system of FIG. 1.

FIG. 2 is an isometric view of an embodiment of a cable connector end 140 portion of exemplary cable system 100 of FIG. 1. In FIG. 2, cable connector end 200 is a close up view of an embodiment of cable connector end 140 of FIG. 1. As shown in FIG. 2, cable connector end 200 can include: cable body 210 and connector 220. Connector 220 can include an exterior threaded mating surface 230 and female contact receptacles 240. In FIG. 2, cable connector end 200 can also include additional elements.

Figure 4:
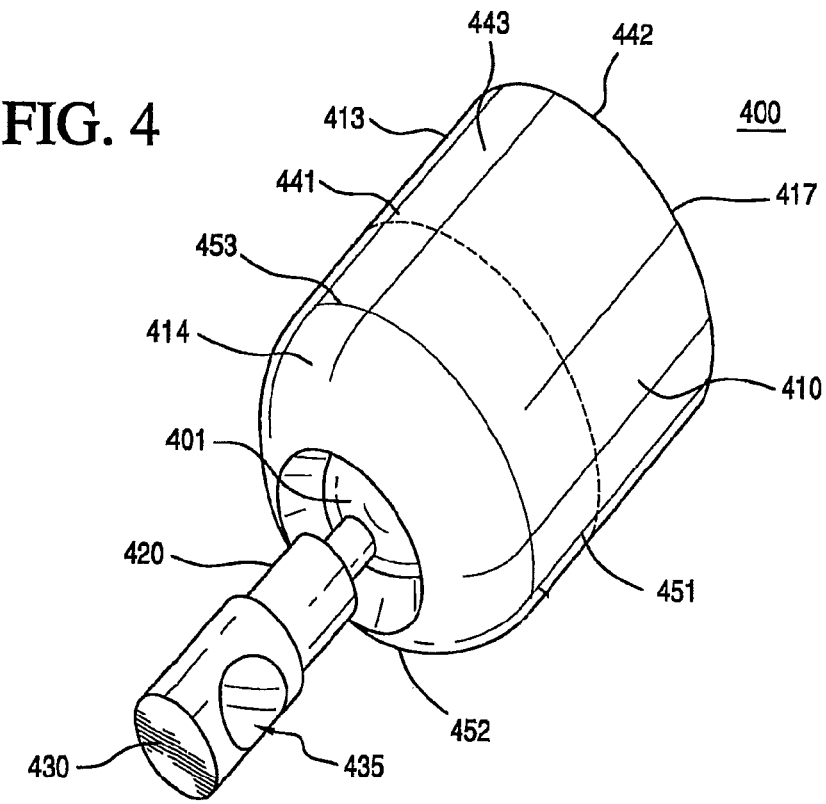
FIG. 4 is an isometric external view of an embodiment of a cable pulling cap portion of the exemplary cable system of FIG. 1.

In some embodiments, threaded mating surface 230 allows a cable pulling cap having a similarly threaded mating surface to be secured to threaded mating surface 230 of cable connector end 200. An example of a cable pulling cap having a threaded mating surface is illustrated in FIG. 4. In some embodiments, cable body 210 encases and provides protection for internal signal carrying and/or power carrying wiring, fiber-optic wiring or any such other transmission medium utilizing a protective covering. In one embodiment, connector 220 is mechanically coupled to cable body 210 and allows the cable within cable body 210 to be connected to a receptacle.

In an example, as illustrated in FIG. 2, connector 220 can be implemented as a female DIN (Deutsches Institut für Normung) connector as commonly used in the commercial and home electronics industry as well the telecommunications industry. In other embodiments, connector 220 and the associated receptacles can be implemented as: (a) a male DIN connector; (b) a male/female RJ45 connector; (c) a male/female RCA connector; (d) a male/female BNC connector; (e) a male/female HDMI (High-Definition Multimedia Interface) connector; (f) DVI (Digital Visual Interface) connector; (g) VGA (Video Graphics Array) connector; (h) DisplayPort connector; (i) AV (Audio-visual) connector; (j) a male/female fiber connector or receptacle (e.g., LC (Lucent Connector), SC (subscriber connector), MT-RJ (Mechanical Transfer Registered Jack), ST (Straight Tip), FC (Ferrule Connector), or MU (Miniature Unit)); (k) a male/female USB (Universal Serial Bus) connector; (l) IEEE (Institute of Electrical and Electronics Engineers) 1394 (e.g., Firewire) connector; (m) 3.5 millimeter (mm) audio connector; or (n) laptop power connector. In other embodiments such as described in FIG. 1, threaded mating surface 230 is implemented as any securing/locking/mating surface, such as, for example a twist and lock surface, a release tab configuration, a slot/securing nub configuration, or the like.

FIG. 3 is an isometric view of another embodiment of cable connector end 140 portion of exemplary cable system 100 of FIG. 1. The isometric view of cable connector end 300 in FIG. 3 is a close up view of an embodiment of the cable connector end 140 of FIG. 1. As shown in FIG. 3, cable connector end 300 can include a cable body 310 and a connector 320. Connector 320 includes an exterior threaded mating surface 330 and female contact receptacles 340. Elements similarly numbered with the last two significant digits and described in FIG. 2 function in a substantially similarly way. In FIG. 3, cable connector end 300 can include additional elements.

FIG. 4 is an isometric external view of an embodiment of cable pulling cap 150 portion of exemplary cable system 100 of FIG. 1. Cable pulling cap 400 in FIG. 4 is a close up view of an embodiment of cable pulling cap 150 of FIG. 1. As shown in FIG. 4, cable pulling cap 400 can include: (a) pulling cap body 410; (b) a rotational bearing 401; and (c) pulling stem 420.

In some examples, pulling cap body 410 can include a lower portion 413 and an upper portion 414. Lower portion 413 can have a top 441 and a bottom 442. Lower portion 413 can include one or more lower sidewalls 443 that define a lower cavity. In the example shown in FIG. 4, lower portion 413 only includes one sidewall. In other examples, lower portion 413 can include two or more sidewalls.

Figure 10:
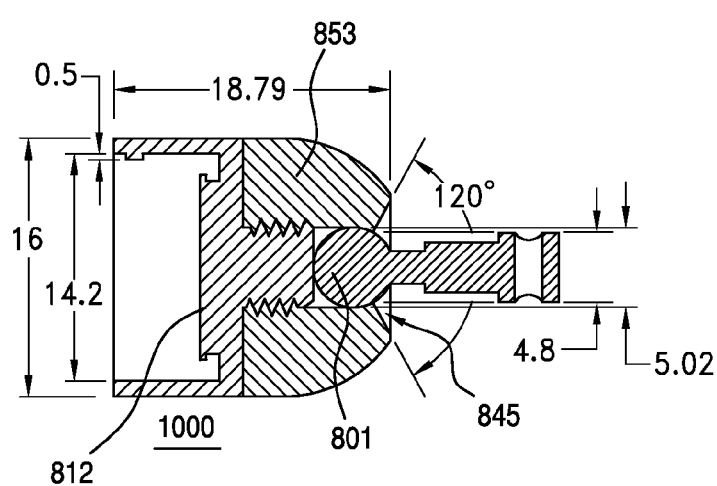
FIG. 10 illustrates an internal cross-section of an embodiment of cable pulling cap of exemplary cable system of FIG. 1.

Upper portion 414 can include a top 452 and a bottom 451. Upper portion 414 can include one or more upper sidewalls 453 that define an upper cavity 845 (FIG. 10). In some examples, bottom 451 is configured to mechanically couple to the top 441. In the example shown in FIG. 4, upper portion 414 only includes one sidewall. In other examples, upper portion 414 can include two or more sidewalls.

Pulling cap body 410 can include an internal barrier (e.g., internal barrier 612 of FIG. 6), a bearing access channel, and an attachment channel 417. The internal barrier also can define a portion of upper cavity 845 (FIG. 10) and a lower cavity. In FIG. 4, cable pulling cap 400 can include additional elements.

In one embodiment, pulling cap body 410 can be manufactured in two pieces, namely, lower portion 413 and upper portion 414. Lower portion 413 can be a cylindrical hollow object having a first end and a second end. The first end of lower portion 413 includes a threaded mating portion that extends from the internal barrier and toward the second end of lower piece 413. The second end of lower portion 413 is formed to define attachment channel 417 as an opening of the lower cavity (not shown in FIG. 4, but an example is illustrated in FIG. 6). The first end of lower portion 413 also defines a portion of the interior of pulling cap body 410.

Upper portion 414 can have a top 452 formed as a domed surface including a circular bearing access channel in communication with the upper cavity (not shown in FIG. 4, but an example is illustrated in FIG. 10) for housing rotating bearing 401. Additionally, upper portion 414 includes bottom 451 opposite the top 452 and configured to receive the threaded mating portion of lower portion 413.

In one embodiment, lower portion 413 and upper portion 414 can be mechanically coupled, attachably affixed, or mated in a manner known in the art, such as, for example using spot welding, sonic welding, electro welding, metal cement and the like. Another embodiment of lower portion 413 and upper portion 414 are also described in FIG. 10.

In other embodiments, pulling cap body 410 can be manufactured as a single piece cylindrical hollow object and includes the internal barrier defining lower portion 413 and upper portion 414. In these embodiments, the internal barrier 612 (FIG. 6) can be implemented as a disk manufactured to size and mechanically coupled or otherwise affixed to the inside surface of pulling cap body 410. In other embodiments, the internal barrier 612 (FIG. 6) can be implemented as a barrier formed from the internal portions of pulling cap body 410 during the process of manufacturing pulling cap body 410. Embodiments of pulling cap body 410 are further detailed in FIGS. 5-12, below.

In FIG. 4, pulling stem 420 can include pulling cap tip 430 with pulling eye hole 435 and rotating bearing 401. Pulling eye hole can passes substantially through an end of the pulling stem and can be perpendicular to a length of the pulling stem.

In one embodiment, rotating bearing 401 is spherical shaped and sized to fit within the upper cavity. Rotating bearing 401 has a diameter larger than the diameter of the opening of the bearing access channel, and has a diameter smaller than the upper cavity of pulling cap body 410.

In some embodiments, pulling stem 420, pulling cap tip 430, and rotating bearing 401 can be produced as a single piece. In other embodiments, pulling stem 420 and pulling cap tip 430 can be produced as a single piece with rotating bearing 401 attached to the end of pulling stem 420 opposite pulling eye hole 435, and using any known attachment methodology, such as, for example by using an adhesive, a spot weld, and the like. In the same or different embodiments, pulling stem 420, pulling cap tip 430 and rotating bearing 401 can be manufactured from one or more of the following materials: copper, steel, aluminum, aluminum alloy, nickel, brushed stainless steel, bronze, ABS plastic, ceramic, silicon rubber, natural wood, and/or synthetic wood. In another embodiment, cable pulling cap body 410 can be manufactured from similar materials.

In operation, when rotating bearing 401 is part of pulling stem 420 and within pulling cap body 410 as shown in FIGS. 1 and 10, pulling stem 420 can be maneuvered approximately 120 degrees from side-to-side as well as rotated 360 degrees about the vertical axis of pulling stem 420. Rotating bearing 401 can be maintained in the upper cavity of pulling cap body 410 by an internal barrier 812 (FIG. 10).

Figure 5:
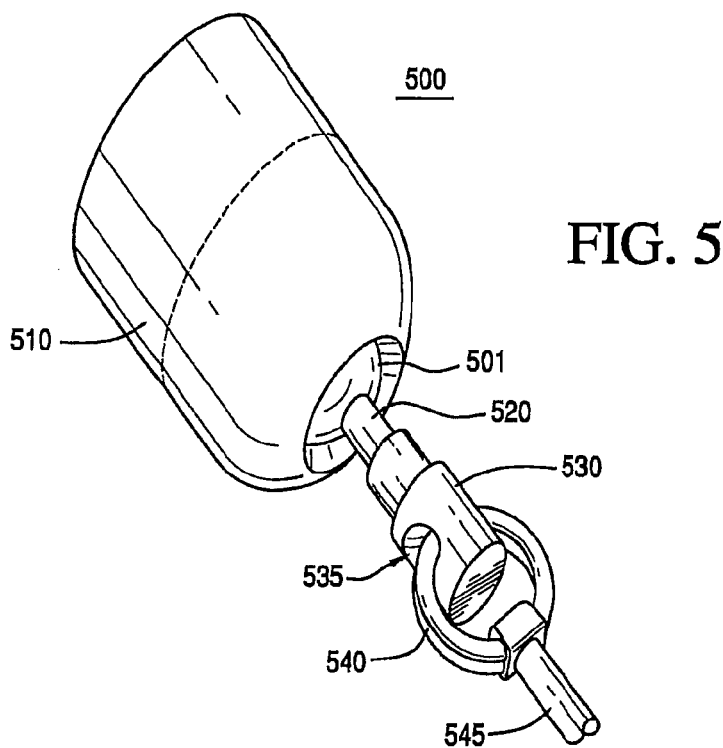
FIG. 5 is an isometric external view of another embodiment of a cable pulling cap portion of the exemplary cable system of FIG. 1.

FIG. 5 is an isometric external view of another embodiment of cable pulling cap 150 of exemplary cable system 100 of FIG. 1. Cable pulling cap 500 in FIG. 5 is another close up view of an embodiment of cable pulling cap 150 of FIG. 1. As shown in FIG. 5, cable pulling cap 500 can include pulling cap body 510 and pulling stem 520. Pulling stem 520 can include pulling cap tip 530 with pulling eye hole 535 and rotating bearing 501. Elements similarly numbered with the last two significant digits and described in FIG. 4 function in a substantially similarly way. In FIG. 5, cable pulling cap 500 can include additional elements.

In FIG. 5, cable pulling cap 500 can additionally includes cable pulling ring 540 and cable pulling line 545. In one embodiment, cable pulling line 545 is attached to cable pulling ring 540, which is in turn attached to pulling stem 520 via pulling eye hole 535. In this embodiment, the combination of cable pulling line 545 and cable pulling ring 540 attached to pulling stem 520 provides a user with the ability to maneuver a cable attached to cable pulling cap 500 through a constricted area, such as, for example to maneuver a cable attached to cable pulling cap 500 through the space between the walls of a commercial or residential building.

FIG. 6 is an isometric internal view of an embodiment of cable pulling cap 150 portion of exemplary cable system 100 of FIG. 1. Cable pulling cap 600 in FIG. 6 is a close up view of an embodiment of cable pulling cap 150 of FIG. 1. As shown in FIG. 6, cable pulling cap 600 can include: pulling cap body 610 and pulling cap tip 630 of the pulling stem (not shown). Cable pulling cap 600 additionally can include cable pulling ring 640 and cable pulling line 645. Elements similarly numbered with the last two significant digits and described in FIGS. 4 and 5 function in a substantially similarly way. In FIG. 6, cable pulling cap 600 can include additional elements.

As illustrated in FIG. 6, cable pulling cap 600 also can include lower cavity 611, internal barrier 612, and threaded surface 615. Internal barrier 612 can separate the upper cavity from at least a portion of lower cavity 611. Lower cavity 611 is defined by the internal walls of pulling cap body 610 and internal barrier 612. The internal walls of pulling cap body 610 include threaded surface 615 to facilitate mating of pulling cap body 610 to a cable connector end, such as, for example, cable connector end 200 of FIG. 2 or cable connector end 300 of FIG. 3, above.

FIG. 7 is an isometric internal view of another embodiment of cable pulling cap 150 portion of exemplary cable system 100 of FIG. 1. Cable pulling cap 700 in FIG. 7 is a close up view of an embodiment of cable pulling cap 150 of FIG. 1. As shown in FIG. 7, cable pulling cap 700 can include: (a) pulling cap body 710; (b) pulling stem 720; (c) pulling cap tip 730; (d) cable pulling ring 740; (e) cable pulling line 745; (f) lower cavity 711; (g) internal barrier 712; and (h) threaded surface 715. Elements similarly numbered with the last two significant digits and described in FIGS. 4-6 function in a substantially similarly way. In FIG. 7, cable pulling cap 700 can include additional elements.

Lower cavity 711 is defined by the internal walls of pulling cap body 710 and internal barrier 712. The internal walls of pulling cap body 710 include threaded surface 715 to facilitate mating of pulling cap body 710 to a cable connector end, such as, for example, cable connector end 200 of FIG. 2 or cable connector end 300 of FIG. 3.

Figure 8:
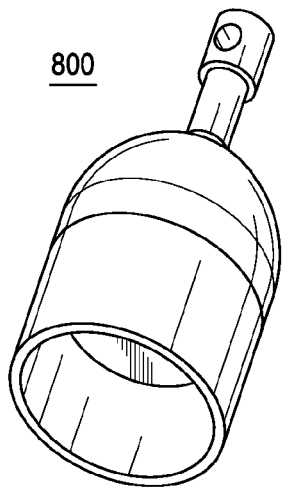
FIG. 8 illustrates isometric internal view of an embodiment of cable pulling cap of exemplary cable system of FIG. 1.

FIG. 8 illustrates isometric internal view of an embodiment of cable pulling cap 800 of exemplary cable system 100 of FIG. 1.

Figure 9:
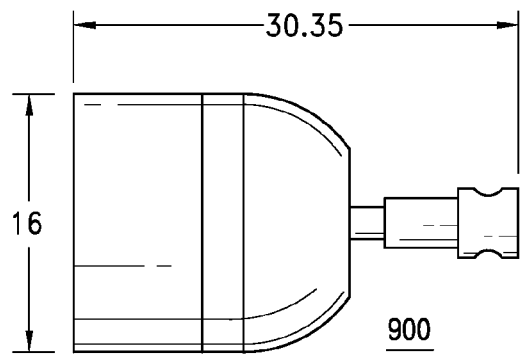
FIG. 9 illustrates a side-view of an embodiment of cable pulling cap of exemplary cable system of FIG. 1.

FIG. 9 illustrates a side-view of an embodiment of cable pulling cap 900 of exemplary cable system 100 of FIG. 1. FIG. 9 also includes the diameter and height dimensions in millimeters of several portions of cable pulling cap 900.

FIG. 10 illustrates an internal cross-section of an embodiment of cable pulling cap 1000 of exemplary cable system 100 of FIG. 1. FIG. 10 also includes dimensions of the cable pulling cap in millimeters and also includes arrows showing the mobility and/or functionality of the pulling stem. FIG. 10 additionally illustrates the upper and lower pieces and the internal barrier as described in FIG. 4, as well as a threaded attachment methodology for coupling the lower piece to the upper piece. In one example, internal barrier 812 can include be coupled to (e.g., threaded to) upper sidewalls 853 that define an upper cavity 845. By coupling the upper sidewalls 845 to internal barrier 812, rotating bearing 801 can be held in place.

Figure 11:
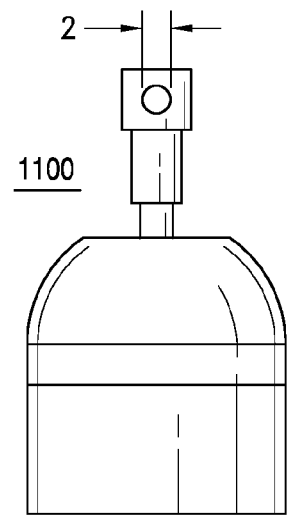
FIG. 11 illustrates an upright view of a representation of an embodiment of cable pulling cap of exemplary cable system of FIG. 1.

FIG. 11 illustrates an upright view of a representation of an embodiment of cable pulling cap 1100 of exemplary cable system 100 of FIG. 1. FIG. 11 also illustrates an example of the diameter of the pulling eye hole in millimeters.

Figure 12:
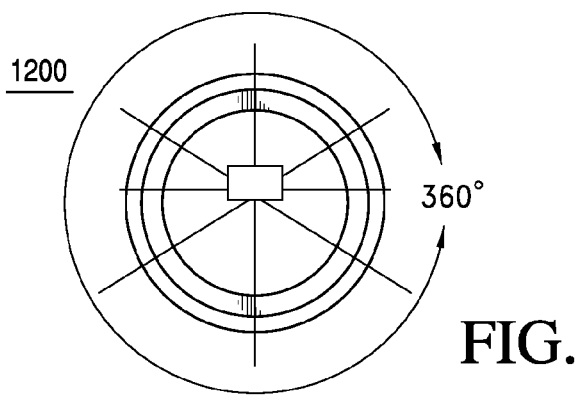
FIG. 12 illustrates an internal circular view of an embodiment of cable pulling cap of exemplary cable system of FIG. 1.

FIG. 12 illustrates an internal circular view of an embodiment of cable pulling cap 1200 portion of exemplary cable system 100 of FIG. 1. FIG. 12 also illustrates arrows and lines showing the mobility and/or functionality of the pulling stem. In some examples, pulling caps 800, 900, 1000, 1100, and/or 1200 can be similar or identical to cable pulling cap 150.

Figure 13:
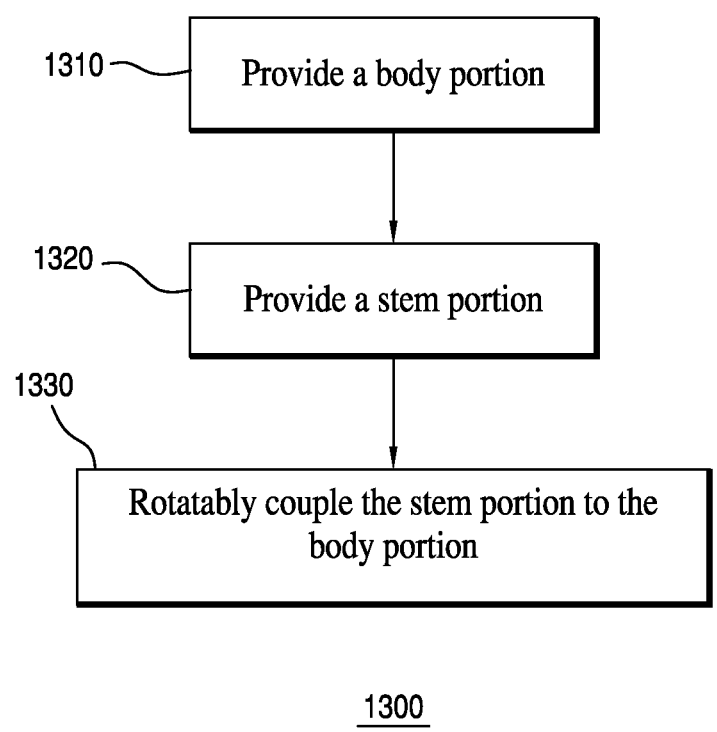
FIG. 13 illustrates a flow chart for an embodiment of a method of manufacturing a cable pulling cap, according to an embodiment.

FIG. 13 illustrates a flow chart for an embodiment of a method of manufacturing a cable pulling cap, according to an embodiment. Method 1300 is merely exemplary and is not limited to the embodiments presented herein. Method 1300 can be employed in many different embodiments or examples not specifically depicted or described herein.

Method 1300 includes an activity 1310 of providing a body portion. In some examples, a first end can include a coupling mechanism configured to couple to a cable. For example, the body can be similar or identical to pulling cap body 410 of FIG. 4.

Method 1300 in FIG. 13 also includes an activity 1320 of providing a stem portion. For example, the stem portion can be similar or identical to pulling stem 420 of FIG. 4.

Next, method 1300 continues with an activity 1330 of rotatably coupling the stem portion to the body portion. In some examples, the rotatably coupling of the stem portion to the body portion can be similar or identical to the rotatably coupling of cap body 410 to pulling stem 420 as illustrated in FIG. 4.

Figure 14:
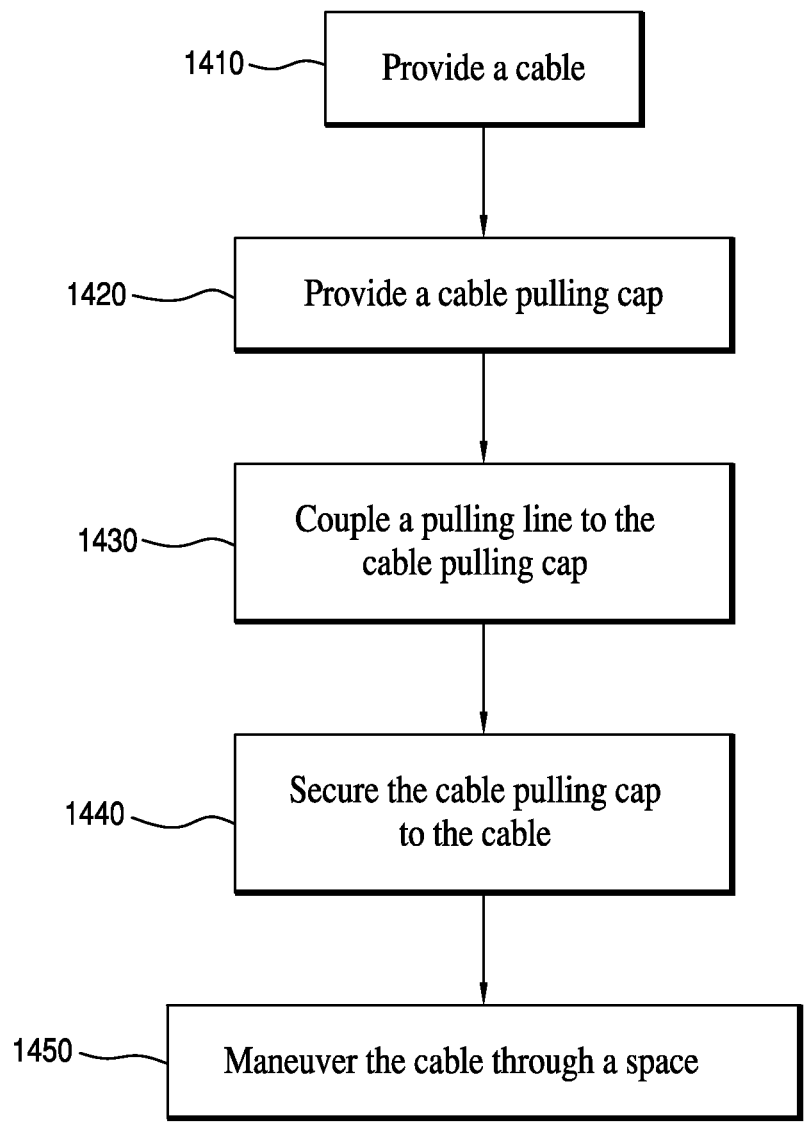
FIG. 14 illustrates a flow chart for an embodiment of a method of using a cable system with a cable pulling cap, according to an embodiment.

FIG. 14 illustrates a flow chart for an embodiment of a method 1400 of using a cable system with a cable pulling cap, according to an embodiment. Method 1400 is merely exemplary and is not limited to the embodiments presented herein. Method 1400 can be employed in many different embodiments or examples not specifically depicted or described herein Method 1400 includes an activity 1410 of providing a cable. As an example, the cable can be similar or identical to cable 110 of FIG. 1.

Method 1400 in FIG. 14 continues with an activity 1420 of providing a cable pulling cap. As an example, the cable end cap can be similar or identical to cable pulling cap 150 of FIG. 1. In some examples, the cable pulling cap can include and/or be attached to a cable pulling line (e.g., cable pulling line 545 of FIG. 5)

Method 1400 can include an activity 1430 of coupling a pulling line to the cable pulling cap. For example, the pulling line can be coupled to a pulling stem portion of the cable pulling cap. In other examples, the cable pulling cap can include a cable pulling line (e.g., cable pulling line 545 of FIG. 5)

Subsequently, method 1400 of FIG. 14 includes an activity 1440 of securing the cable pulling cap to the cable. For example, as illustrated in FIG. 1, cable pulling cap 150 can be secured to cable connector end 140 of second cable end 130 of cable 110 by aligning a securing nub of cable pulling cap 150 with cap securing slot 148 and rotating and/or otherwise maneuvering the securing nub of cable pulling cap 150 through cap securing slot 148 to a secure position near the base of cable connector end 140.

Next, method 1400 of FIG. 14 includes an activity 1450 of maneuvering the cable through a space. In some embodiments, the cable pulling cap is include and/or be attached to a cable pulling line and the cable pulling line can be used to help maneuver the cable through a space. For example, the cable can be maneuvered through a tight or confined space (a wall interior or length piping) over a lengthy distance by threading cable pulling line through the space and then using the cable pulling line to pull the cable through the space.

Although the invention has been described with reference to specific embodiments, it will be understood by those skilled in the art that various changes may be made without departing from the spirit or scope of the invention. For example, to one of ordinary skill in the art, it will be readily apparent that the electrical connector can be an electrical plug that conforms to European or other countries' standards, instead of a plug that conforms to United States standards. In another example, the electrical connector is a two prong connector, instead of a three prong connector. In a further example, the conductors have a non-annular and/or irregular shape. In yet another example, the housing can be referred to as a casing and sections can be referred to as portions. In a further example, rotating outer housing can be referred to as a plug face portion. In still another example, the conductors can have a number of different shapes as long as the prongs can maintain contact and electrical coupling with the conductors while the prongs are rotated. In one embodiment, the conductors can be at least a portion of a twenty sided polygon. In a yet further example, at least one conductor of conductors has a shape different than the other two conductors. Additional examples of such changes have been given in the foregoing description. Accordingly, the disclosure of embodiments of the invention is intended to be illustrative of the scope of the invention and is not intended to be limiting. It is intended that the scope of the invention shall be limited only to the extent required by the appended claims.

For example, to one of ordinary skill in the art, it will be readily apparent that the electrical connector and method discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment of the invention, and may disclose alternative embodiments of the invention.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A pulling cap for pulling electrical data cables between rooms in a home or between operational locations of a business, the electrical data cables each comprising a cable end having multiple contact receptacles, the pulling cap comprising:
    a pulling cap body comprising:
        a first piece containing a first coupling portion that mates with a second coupling portion on the cable end of the electrical data cables for pulling the electrical data cables;
        a second piece containing a cavity within the pulling cap body wherein the first piece is attached to the second piece;
        an opening to the cavity opposite the threaded portion of the pulling cap body;
    a spherical bearing located within the cavity, wherein the spherical bearing has a diameter larger than a diameter of the opening to the cavity and wherein the spherical bearing is in contact with an end portion of the first piece;
    a pulling stem attached to or a single piece with the spherical bearing and extending through the opening to the cavity wherein the pulling stem and the spherical bearing are free to rotate relative to the pulling cap body and the pulling stem and spherical bearing are free to swivel relative to the pulling cap body; and
    a pulling eye attached to or a single piece with the pulling stem, opposite the spherical bearing, wherein the pulling eye is configured to connect the pulling cap to a cable pulling line.

2. The pulling cap of claim 1 wherein the first piece is attached to the second piece with mating threads on the first piece and on the second piece.

3. The pulling cap of claim 2 wherein the mating threads on the second piece are internal threads located within the cavity.

4. The pulling cap of claim 3 wherein the mating threads on the first piece are external threads that extend into the cavity.

5. The pulling cap of claim 1 wherein the second piece traps the spherical bearing within the cavity.

6. The pulling cap of claim 1 further comprising the cable pulling line.

7. The pulling cap of claim 6 further comprising a cable pulling ring connecting the pulling eye to the cable pulling line.

8. The pulling cap of claim 1 wherein the second coupling portion of the electrical data cables comprise an external threaded surface and the first coupling portion of the pulling cap body comprises an internally threaded surface.

9. The pulling cap of claim 1 wherein the first coupling portion of the pulling cap body comprises a first threaded surface, the second coupling portion of the electrical data cables comprise a second threaded surface, and the first threaded surface mates with the second threaded surface.

* * * * *

UNITED STATES PATENT AND TRADEMARK OFFICE
CERTIFICATE OF CORRECTION

PATENT NO. : 8,413,961 B2
APPLICATION NO. : 12/685674
DATED : April 9, 2013
INVENTOR(S) : Sydney Wen It is certified that error appears in the above-identified patent and that said Letters Patent is hereby corrected as shown below:

In the Claims:

In claim 1, delete the word "threaded" (col. 10, line 26) and in its place, insert the words --first coupling--.

Signed and Sealed this
Fourth Day of June, 2013

Teresa Stanek Rea
*Acting Director of the United States Patent and Trademark Office*